United States Patent [19]

Leroy et al.

[11] Patent Number: 4,546,756
[45] Date of Patent: Oct. 15, 1985

[54] TRACKING SYSTEM

[75] Inventors: Vernon A. Leroy, Watersmeet, Mich.; Harold D. Gaedtke; Harold D. Gaedtke, both of Tomahawk, Wis.

[73] Assignee: G&G Solar, Inc., Wausau, Wis.

[21] Appl. No.: 330,512

[22] Filed: Dec. 14, 1981

[51] Int. Cl.$^4$ ............................................. J24D 3/00
[52] U.S. Cl. .................................... 126/424; 350/568; 126/425
[58] Field of Search ............... 126/417, 424, 425, 438, 126/451; 353/3; 350/568

[56] References Cited

U.S. PATENT DOCUMENTS

| | | |
|---|---|---|
| 1,632,254 | 6/1927 | Vinogradov ............................ 353/3 |
| 3,656,844 | 4/1972 | Botskor ................................... 353/3 |
| 4,011,854 | 3/1977 | Brantley ............................... 126/425 |
| 4,122,827 | 10/1978 | Rhodes .................................. 353/3 |
| 4,147,154 | 4/1979 | Lewandowski ..................... 126/425 |
| 4,202,321 | 5/1980 | Volna ..................................... 353/3 |
| 4,217,881 | 8/1980 | Brent ................................... 126/425 |
| 4,245,616 | 1/1981 | Wyland ................................ 126/425 |
| 4,295,621 | 10/1981 | Siryj ....................................... 353/3 |
| 4,297,000 | 10/1981 | Fries ....................................... 353/3 |
| 4,368,962 | 1/1983 | Hultberg ............................... 353/3 |

FOREIGN PATENT DOCUMENTS 117112 9/1980 Japan .................................. 350/568

Primary Examiner—Samuel Scott
Assistant Examiner—Noah Kamen
Attorney, Agent, or Firm—Jay M. Cantor

[57] ABSTRACT

A system of tracking the sun each day of the year with compensation for changes in time of sunrise and time of sunset as well as sun declination on a day to day basis, declination being under control of a crank that makes one revolution per year. The equation of time is under control of a cam that also revolves once a year and resets the clock to reflect solar rather than mean solar time in order to properly follow the sun. The position of sun acquisition and loss are a function of the declination and the time is a function of the clock corrected via the cam for equation of time. Thus, when the declination is reset each day, it sets the position of acquisition and loss while the clock, now set for the change due to the equation of time, determines the time of acquisition and loss.

10 Claims, 9 Drawing Figures

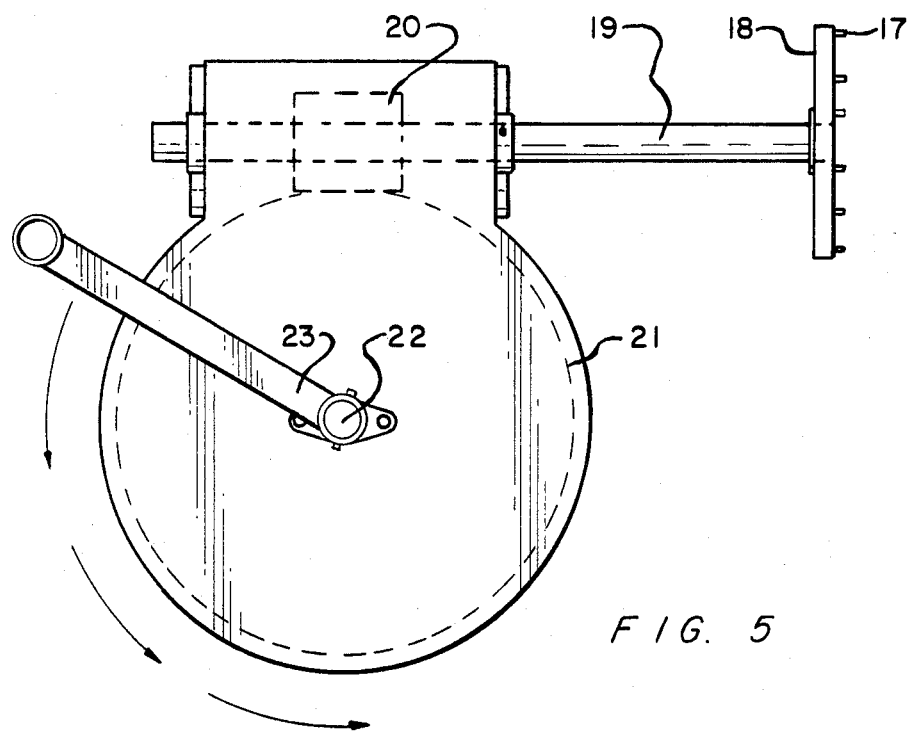
FIG. 5
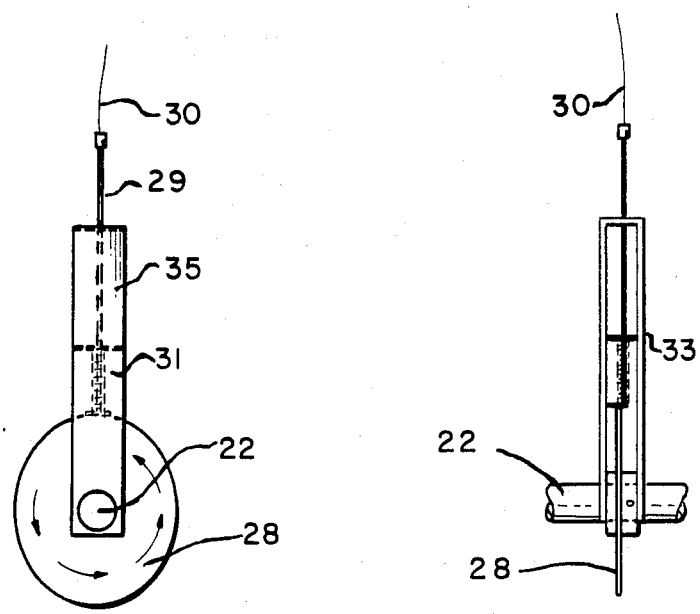
FIG. 7
FIG. 6

TRACKING SYSTEM

BACKGROUND OF THE INVENTION

1. Field of the Invention

The invention relates to a simple low powered system for tracking the sun from east to west on a day by day basis with daily adjustment for time of sunrise and sunset as well as adjustment for the appropriate declination in accordance with the time of day and date to accurately face the sun during its traversal of the sky, even when the sun is hidden behind clouds.

2. Description of the Prior Art

Systems for tracking the sun are well known in the art. Such systems in the past have mainly encompassed the use of photo-responsive electrical devices and electrical circuitry connected thereto which determine the direction of sun movement relative to the photo-responsive devices and continually, via the electronic or electrical circuity, realigning the system so that the sun was always at the center of the photo-responsive device. Systems of this type are expensive to operate and difficult to service when knowledgeable personnel are not available. Furthermore, such devices can only track the sun when the sun is visible. Often, when the sun is blocked by clouds or other interfering elements for excessive periods of time, the optical tracks completely lose the sun and are unable to pick it up and track it when it again becomes visible.

In order to track the sun, it is necessary to calculate the location of the sun at any time of the day for the geographical located involved.

When dealing with the sun and its angular relationship with any geogrphical location, it is also neccessary to use "SOLAR TIME" and declination.

Declination is the angular difference of the sun's position with respect to the equator, being north of the equator in the summer and south of the equator in the winter, the variation being approximately sinusoidal and thus can be approximated by a crank. Solar time does not coincide with local clock time much of the time. It is necessary to convert standard time to solar time by applying two corrections. First, there is a constant correction for any difference in longitude between the location and the meridiam on which local standard time is based. (75, 90, 105 and 120 degrees west longitude in the continental United States). The second correction is the EQUATION OF TIME, which takes into account the various perturbations in the earth's orbit and rate of rotation which effect the time the sun appears to cross the observer's meridan. The correction is obtained from published charts and tables.

SUMMARY OF THE INVENTION

In accordance with the present invention there is provided a system for tracking the sun from east to west with automatic appropriate adjustments being made on a daily basis to compensate for change in time of sunrise, time of sunset and change in declination during the year on a day by day basis and which accurately tracks the sun, even when it is obscured for some reason. This is accomplished by providing a system for tracking the sun each day of the year with compensation for change in time of sunrise and time of sunset as well as sun declination on a day by day basis, declination being under control of a crank that makes one revolution per year. The equation of time is under control of a cam that also revolves once a year and resets the clock to reflect solar rather than mean solar time in order to properly follow the sun. The position of such acquisition and loss are a function of declination and the time is a function of the clock corrected via the cam for the equation of time. Thus, when the declination is reset each day, it sets the position of acquisition and loss while the clock, now reset for the change due to the equation of time, determines the time of acquisition and loss.

DESCRIPTION OF THE DRAWINGS

FIG. 5 is an enlarged view of the elements 17 through 23 of FIGS. 2 and 4;

FIG. 6 is an enlarged front view of the cam and cam following mechanism shown in FIGS. 2 and 4;

FIG. 7 is a side view of the structure of FIG. 6;

DESCRIPTION OF THE PREFERRED EMBODIMENTS

Figure 1:
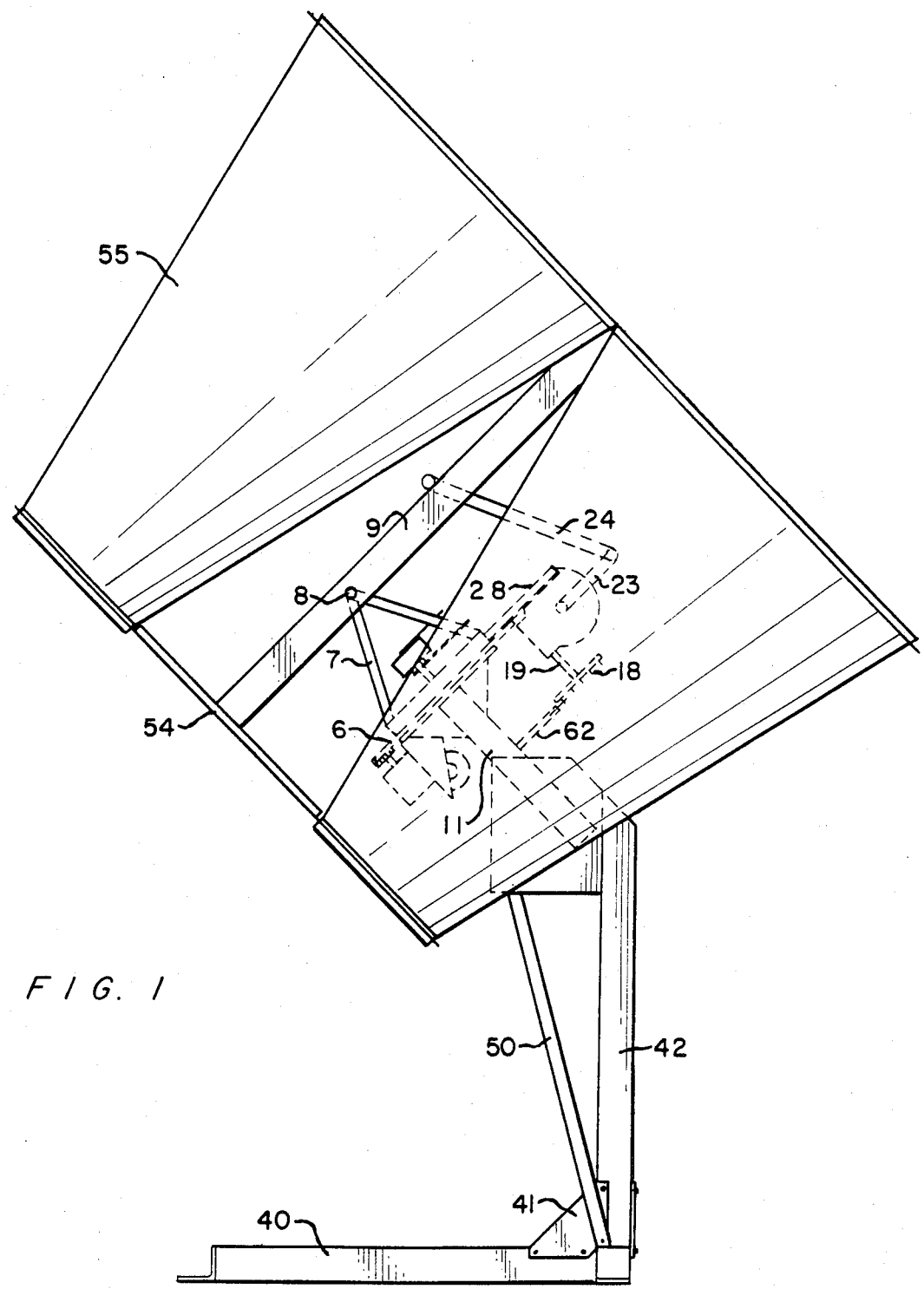
FIG. 1 is a side view of a solar energy conversion system utilizing the tracking system in accordance with the present invention.

Referring first to FIG. 1, there is shown a solar energy conversion system utilizing the drive mechanism in accordance with the present invention. The system includes a base 40 positioned on the ground in a horizontal position which is secured to a support 42 with the assistance of an angle member 41. An arm 50 is a brace and is secured at one end to the junction of the base 40 and support 42 and at the other end to drive mechanism for the energy gathering device as will be explaned in detail hereinbelow.

Figure 2:
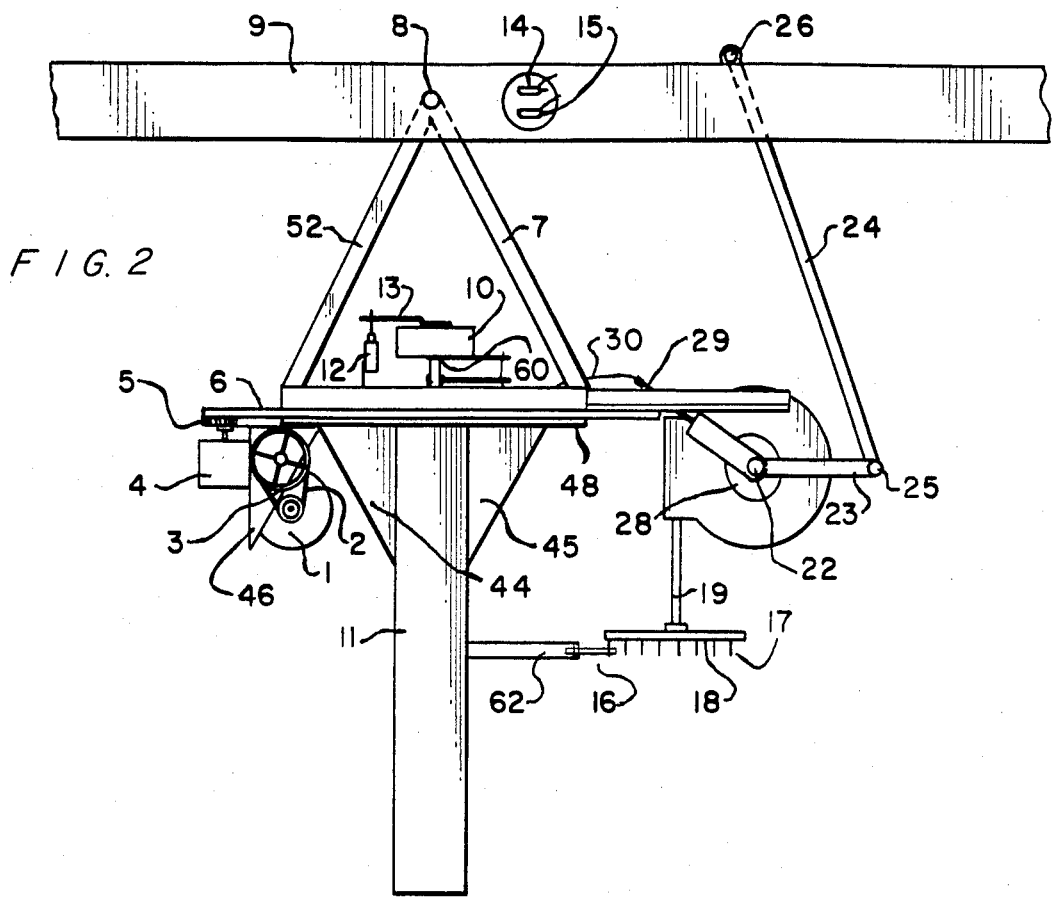
FIG. 2 is a side view of the sun tracking mechanism in accordance with the present invention.

Referring now to FIG. 2, there is shown the arm 11 and angle members 44, 45 and 46 secured to a base member 48. The base member 48 is parallel to and supported by the arm 11 to which the members 44 and 45 are also secured. Therefore base member 48 is parallel to the plane of the equator and is an equatorial mount. The arm 11, which supports the entire drive mechanism and provides the bearing for the rotating structure, as explained hereinbelow, is mounted in structure 42 (FIG. 1) at an acute angle in relation to the horizontal and equal to the latitude and oriented in a true northerly direction (this would be a true southerly direction in the southern hemisphere). Stated in other terms, the arm points to the position of Polaris corrected for the body's displacement from the extension of the earth's axis to infinity. The arm 11 supports the entire drive mechanism and provides the bearing for the rotating structure as will be described.

Figure 3:
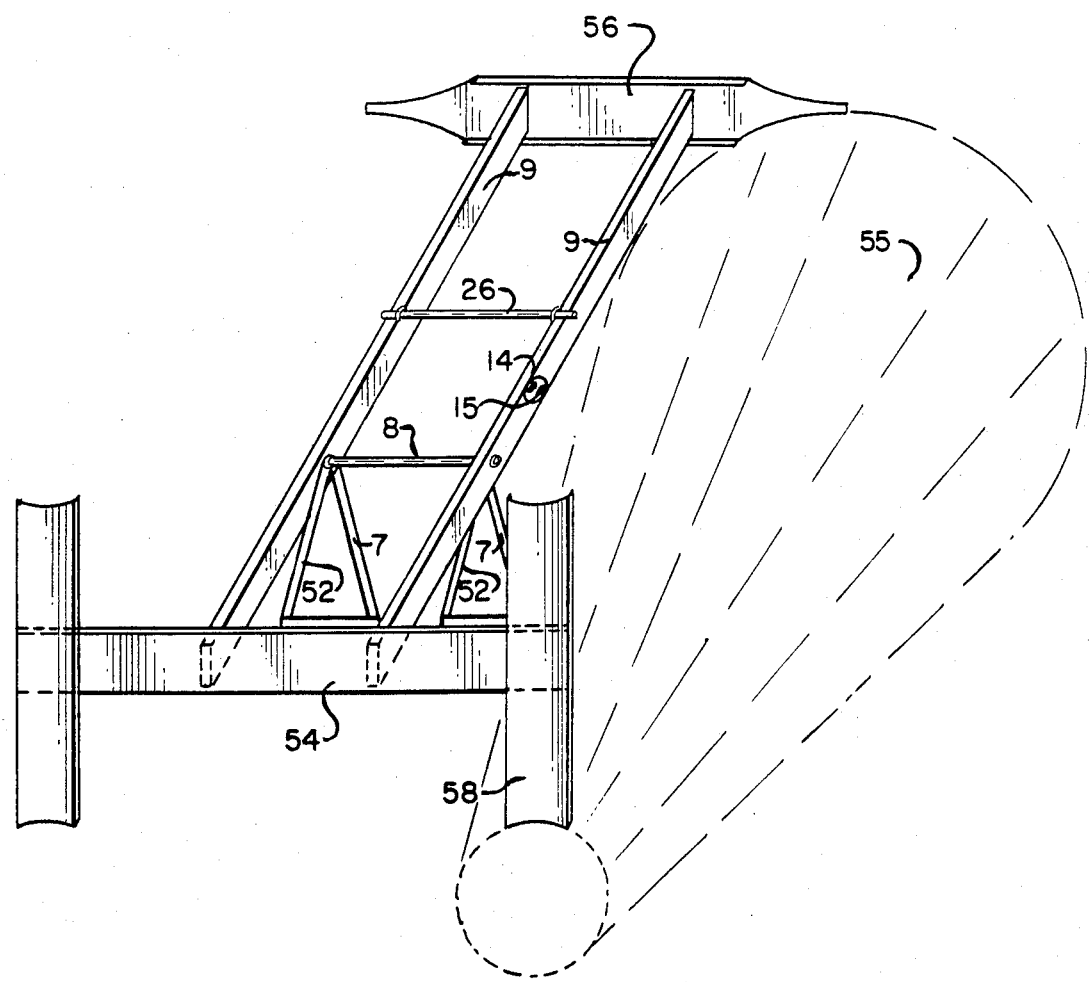
FIG. 3 is a top view of the energy collecting device.

A fractional horsepower AC motor 1 is secured in the position shown by standard apparatus (not shown) to base member 48 and drives the "V" belt 2 which in turn drives pulley 3 which is secured to the member 46. The pulley 3 drives a worm reduction gear 4 secured in the position shown to base member 48 by structure not shown, the worm gear driving a gear 5 which, in turn, drives a driving plate or base 6 having gear teeth on its periphery and which is rotatably positioned on the base 48 and rotates thereon about its central axis at a predetermined angular rate. The driving plate 6 supports the inverted V-shaped structure 7 and 52 which is joined at the pivot 8. The pivot 8 is secured in and supports beam pair 9 (see FIGS. 3 and 4), the beams 9 being pivotable in a plate normal to plate 6 about the pivot 8. Beams 9 are the main support structure for energy collecting devices 55 and lie at an angle to the plate. The energy collecting devices 55, shown in FIG. 1, are secured at the front ends to the support members 56 and at the rear section to support members 58 as better shown in FIG. 3. The beam structure is formed by two parallel beam members 9 interconnected at the front end by a support member 56 and at the rear by the support 54 having support members 58 attached thereto which in turn attach to the rear of the energy collecting device 55. The pivot 8 as shown in FIG. 3 is a rod extending between the members 9.

Figure 8:
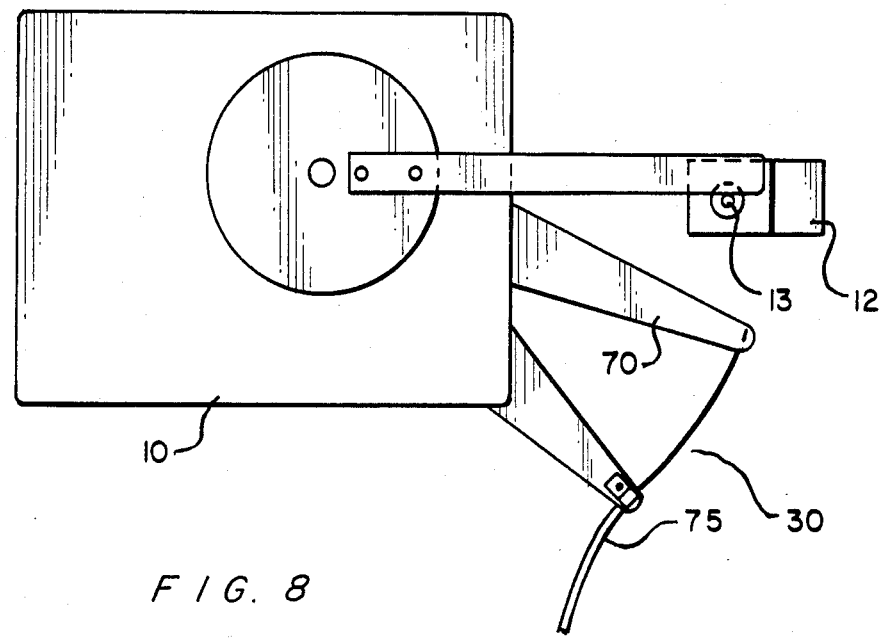
FIG. 8 is a top view of the clock mechanism 10 used in accordance with the present invention.
Figure 9:
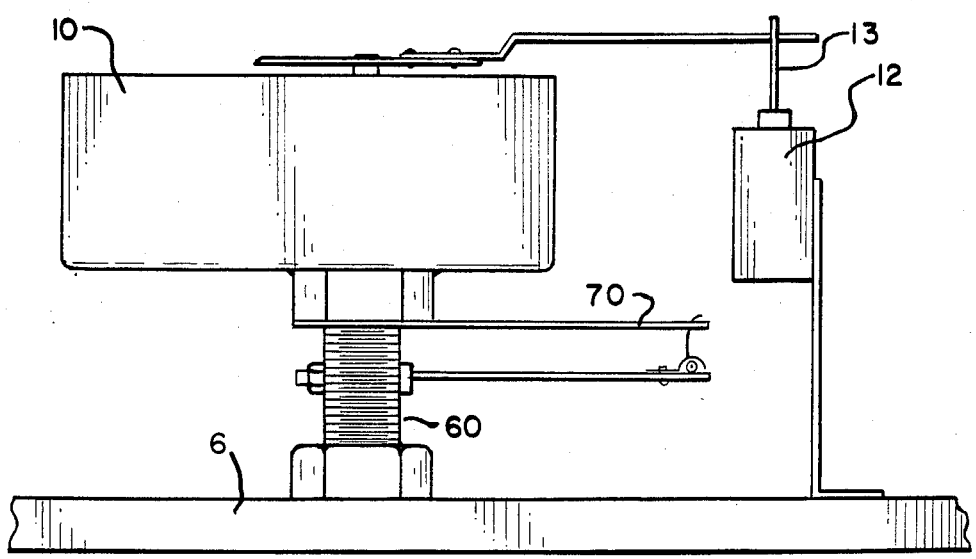
FIG. 9 is a side view of the clock mechanism of FIG. 8.

Referring again to FIG. 2, the rotational speed of the driving plate 6 is controlled by a clock 10 having a contact arm 13 thereon (FIGS. 8 and 9). The clock 10 is mounted to rotate on shaft 60 shown in FIG. 9, the shaft 60 being secured to the arm 11. Rotation of clock 10 on shaft 60 is under the control of arm 70 and thus the equation of time cam 28 as will be shown in more detail hereinbelow. An incrementing switch 12 (FIGS. 2, 8 and 9) which controls the operating window is secured on the plate 6 and rotates therewith, thereby causing the energy absorbing device to track the sun across the sky during the daylight hours.

When the beam 9, after a predetermined rotation and while following the sun to the west, reaches a predetermined angle above the horizon to the west, a switch 14 mounted on the support beam 9, is activated, and through reversing relays, causes the motor 1 to reverse its direction of rotation and turn the entire support structure and energy absorbing devices thereon back to the east where the system will be ready for the next day's sunlight in the appropriate position at sunrise. This position is determined by the switch 15 on the beam 9 which shuts off the motor 1 when the appropriate sunrise position has been reached.

Figure 4:
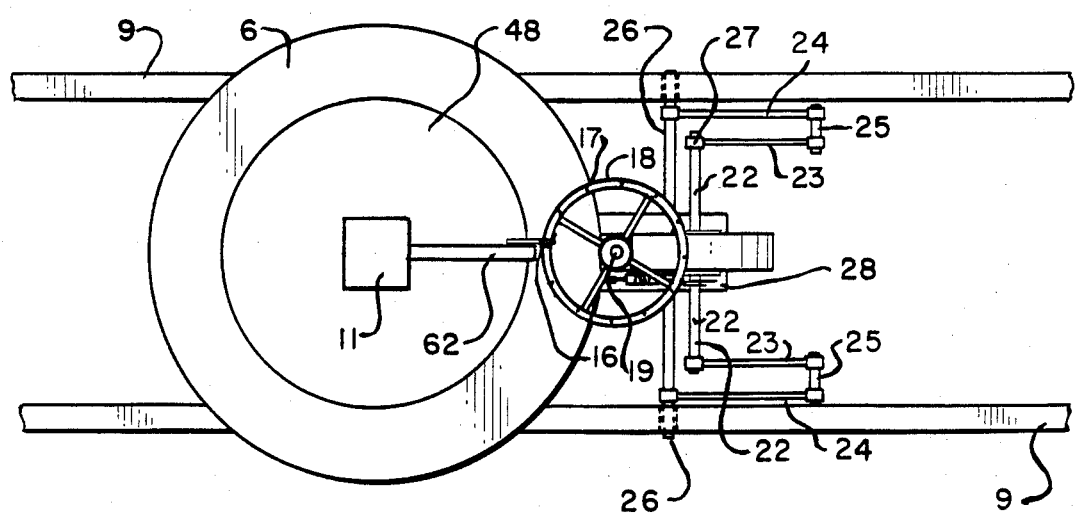
FIG. 4 is a view taken along the lines 4—4 of FIG. 4.

During the travel back from west to east as best shown in FIGS. 2, 4, and 5, a finger 16, secured to the arm 11 by the element 62 contacts one of the pins 17 on a wheel 18 which turns on the shaft 19. The shaft 19 is secured to and drives a worm gear 20 best shown in FIG. 5 which causes a seventy-three tooth worm gear 21 to advance 1/365th of a revolution, thereby driving shaft 22 which is secured to the gear 21 therewith. The shaft 22 is secured to a crank 23 which in turn is pivotally connected to a connecting rod 24 by a pin 25 as shown in FIG. 2. The other end of the rod 24 is pivotally connected to the pivot 26 which is rotatably secured to the beam 9 whereby movement of the rod 24 causes the support structure to rotate around the pivot 8 in the amount of the declination change of one day at that particular time of the year for reasons and in a manner to be described hereinbelow.

Also fastened to shaft 22 and moving therewith is a cam 28 shown in FIGS. 2, 6 and 7, which is designed to accomplish a shifting in the mounting position of the clock 10 via the cam follower 30 positioned within the spring 31. The mounting position of the clock determines the limits of the path of the base 6. The cam is shaped in accordance with the equation of time, the manner of shaping the cam being set forth in the appendix herein. The spring is positioned within the cam follower holder 35. This shaft is the mounting of the clock 10 applies the correction known as "the equation of time" or "sun dial correction" to the clock mechanism in order that the sun may be accurately tracked across the sky each day of the year. It can be seen that the cam 28 will position the cam follower 29 to drive the rod 30 forward or backward via force from the spring 31 to move the lever 70 on the clock mechanism 10 as shown in FIG. 8. The other end of the rod slides in a sheath 75 which is fixed on a bracket. The support structure 9 is secured to the structure 7 and 52 and acts as a support for the elements shown in FIG. 5.

Referring now to FIG. 4, there is shown a crank 23 solidly connected to the shaft 22 at connection 27, the crank 23 being connected to connecting rod 24 by an interconnecting pin 25 pivotally connected to the rods 23 and 24.

Referring to FIG. 4, when the crank 23 and connecting rod 24 have extended to maximum length on June 21, the beam 9 will be at maximum upward angle with respect to the plane of the plate 6. Therefore, it can be seen that it will take more rotation of wheel 6 to cause the beam to become level with respect to the earth.

In contrast, when the crank 23 and connecting rod 24 are in their shortest possible combination (December 21), the beam 9 will be at the smallest angle with respect to the plane of the plate 6 and thus will reach the level or preset position with less rotation of the plate 6.

In addition, it can be seen that the device will be aimed to the south or east or west at the start and finish of the sun's day during the winter and will be to the north of east or west during the hot summer months. Thus, the device will be aimed for the sunrise, the clock arm 13 which has continued to point toward the sun during the night (downward), will pick up the incrementing switch 12 at sunrise (or at the preset angle) causing the tracking to start at the precise time of acquisition of the sun.

The above described system operates in the following manner. Assuming that the system has been preset to track the sun in the east as it rises, energy collecting device 55 will be facing the sun at its point of sunrise and at the appropriate time as set by the member 70 (FIG. 8) under control of the line 30.

The rotational speed is controlled by the 24 hour clock 10 upon which is mounted the arm 13 which, just prior to sunrise, contacts the incrementation switch 12, causing the motor 1 to start the rotation of the energy absorbing device to follow the sun. When the device has travelled a small amount (about a degree) switch 14 opens and the device stops rotating until the clock, moving at the sun speed, catches up again with the switch and the process is repeated, causing the device to track the sun across the sky in small increments.

When the sun has reached a predetermined angle above the horizon to the west, switch 14, through reversing relays, causes the motor 1 to reverse itself, which turns the support structure and the energy absorbing device back to the east, where it will be ready for the next day's sun. This position is determined by the switch 15. Switches 14 and 15 are mercury or other type switches that open or close when the part on which it is mounted is level or at a predetermined angle from the level position.

During the travel back toward the east, finger 16 contacts one of ten pins 17 (FIGS. 2 and 5) on wheel 18, turning shaft 19 and driving worm 20. This causes 73 tooth worm gear 21 to advance 1/365th of a revolution, rotating shaft 22 to which is fastened crank 23. Crank 23 is connected to connecting rod 24 by pivot pin 25 (FIGS. 2 and 4) and at the other end to pivot 26 secured to beam 9, causing the support structure to rotate around pivot 8 in the amount of the declination change for one day at that particular time of the year. Finger 16 is mounted in such a way that it moves wheel 18 only during the travel back to the east (once in twenty-four hours).

Also fastened to shaft 22 is cam 28 (FIGS. 6 and 7) which is designed to accomplish a shift in the mounting position of clock 10 through cam follower 29, cable 30, and arm 70, this shift in the mounting of the clock (much the same as the spark advance or retard on an automobile distributor) applies the correction known as the "equation of time" or such dial correction to the clock mechanism 10 in order that the sun may be accurately tracked across the sky each day of the year. Note that this correction to the clock position is applyed only once in each twenty-four hours by the rotation of the declination wheel 18. Note also that the declination wheel and the equation of time can rotate only one revolution per year.

It can be seen that the crank 23 controls declination of the energy collecting device 55 on a daily basis and also, due to its shape which is a function of the equation of time, the cam 28 and cam the follower will adjust the clock 10 to adjust the starting and ending locations of traversal of the energy collecting device.

In summation the device described above and shown in FIGS. 1 through 4 will drive a solar collector such as shown in FIG. 5, in such a manner as to allow the collector to be in optimum alignment with the sun for each day of the year regardless of whether the sun in obscured by clouds, trees, or other obstructions.

Only in case of a power interruption of great enough duration to cause the clock to be appreciably slow will the device need adjustment except that on each February 29 (leap year) the wheel 18 will need to be retarded by one peg 17.

Due to the well known operation of the equatorial mount as used on telescopes, the length of the day is automatically compensated for by the setting of the switches 14 and 15. When the declination is at the low angles of winter, arm 9 will reach the level or "preset" angle at an earlier time in the evening and, during the reset operation, will reach the level or "preset" angle earlier in the rotation as compared to the summer or high declination angle of the sun.

Referring to FIG. 5, when crank 23 and connecting rod 24 have extended to a maximum length (June 21), beam 9 will be at the maximum angle upward with respect to the plane of wheel 6. Therefore, it can be seen that it will take more rotation of wheel 6 to cause beam 9 to become level with respect to the earth.

In contrast, when crank 23 and connecting rod 24 are at the shortest combination (December 21), beam 9 will be at the least angle will respect to the plane of wheel 6 and thus will reach the level or present position with less rotation of wheel 6.

In addition it can be seen that the device will be aimed to the south of east or west at the start and finish of the sun's day during the winter and will be to the north of east or west during the summer months. Thus the device will be aimed at the sun for the sunrise. The clock arm 13, which has contained to point toward the sun during the night (downward), will pick up the incrementing switch 12 at sunrise (or at the preset angle), causing the tracking to start at the precise time of acquisition of the sun.

It can be seen that there has been provided a simple totally mechanical system which can operate to consistently track the sun even on days when the sun cannot be observed with manual alteration required only on leap years. This overcomes the problem of the prior art electrical system wherein the tracking system can completely lose track of the sun if the sun falls behind a cloud for an excessively long period so that the sun moves out of the range of the photo-responsive tracking devices.

Though the invention has been described with respect to a specific preferred embodiment thereof, mamy variations and modifications will immediately become apparent to those skilled in the art. It is therefore the intention that the appended claims be interpreted as broadly as possible in view of the prior art to include all such variations and modifications.

APPENDIX

This Program Calculates the Shape of a Cam for the Equation of Time

When dealing with the sun and its angular relationship with a geographical location, it is necessary to use "SOLAR TIME". Solar time does not coincide with the local clock time much of the time. It is necessary to convert standard time to solar time by applying two corrections. First there is a constant correction for any differences in longitude between the location and the meridian on which local standard time is based (75, 90, 105 and 120 degrees west longitude in the continental United States). The second correction is the EQUATION OF TIME, which takes into account the various perturbations in the earth's orbit and rate of rotation which affect the time the sun appears to cross the observer's meridian. This correction is obtained from published charts and tables. The base upon which the clock is mounted is retarded or advanced by a cable that is driven by cam 28 (which design is described below), thus delaying or advancing the time that clock arm 11 contacts incrementing switch 12. Thus it can be seen that the time of the clock arm is converted from mean solar time to apparent solar time. In this fashion the mechanism is adjusted daily to the difference in mean and solar time. The portion of computer print out that is used to calculate the shape of the cam 28 which is used to apply the equation of time to the tracking mechanism is explained as follows:

Column A; An (the value of column "A" at line "n")+3. Prints day of the year in three day increments.

Column B: Argument; Equation of time or sun dial correction in minutes for the date in question from sun's ephemeris tables.

Column C: $360/365 \times A$ (n line)+9.86313699.

Prints cam position in degrees starting at 0 (360) December 21 (winter solstice) or day 355.

Column D: (value of column B, line "n", times 0.25)+4.1

Converts minutes to degrees and converts to all positive numbers.

Prints equation of time in degrees positive, converting negative most number to "0".

Column E: D (n)$\times$0.1047197551+2

Converts equation of time in degrees to chord of radius 6 inches (arm length). (constant is chord length per degree at 6" radius).

Prints radius of required cam at corresponding cam position +2" (minimum radius of cam to be 2").

Column F: $E(n) \times \sin((C(n)/180) \times Pi)$. The Computer works in radians.

Converts cam angle in degrees to radians and computes the x coordinate for the cam angle and radius.

Prints the X coordinate.

Column G: $E(n) \times \cos((C(n)/180) \times Pi)$.

Converts the cam angle in degrees to radians and computes the Y coordinate for the cam angle and radius.

Prints the Y coordinate.

Using graph paper the cam is laid out using the "X", "Y" coordinates. This shape is then transferred to the cam material and cut out.

| A<br>Day of Year | B<br>Equation of Time Minutes | C<br>Cam Position Degrees | D<br>Equation of Time Degrees | E<br>Cam Radius Inches + 2 | F<br>X Coordinate of Cam Shape Plot | G<br>Y Coordinate of Cam Shape Plot |
|---|---|---|---|---|---|---|
| 355 | −1.88 | 360.00 | 3.63 | 2.38 | −0.00 | 2.38 |
| 358 | −.38 | 362.96 | 4.01 | 2.42 | 0.12 | 2.42 |
| 361 | 1.1 | 365.92 | 4.38 | 2.46 | 0.25 | 2.45 |
| 364 | 2.57 | 368.88 | 4.74 | 2.50 | 0.39 | 2.47 |
| 1 | 3.63 | 10.85 | 5.01 | 2.52 | 0.48 | 2.48 |
| 4 | 5.03 | 13.81 | 5.36 | 2.56 | 0.61 | 2.49 |
| 7 | 6.35 | 16.77 | 5.69 | 2.60 | 0.75 | 2.49 |
| 10 | 7.62 | 19.73 | 6.01 | 2.63 | 0.89 | 2.47 |
| 13 | 8.77 | 22.68 | 6.29 | 2.66 | 1.03 | 2.45 |
| 16 | 9.83 | 25.64 | 6.56 | 2.69 | 1.16 | 2.42 |
| 19 | 10.8 | 28.60 | 6.80 | 2.71 | 1.30 | 2.38 |
| 22 | 11.66 | 31.56 | 7.02 | 2.73 | 1.43 | 2.33 |
| 25 | 12.38 | 34.52 | 7.20 | 2.75 | 1.56 | 2.27 |
| 28 | 13 | 37.48 | 7.35 | 2.77 | 1.69 | 2.20 |
| 31 | 13.5 | 40.44 | 7.48 | 2.78 | 1.80 | 2.12 |
| | | | | * | | |
| | | | | * | | |
| | | | | * | | |
| 244 | −.03 | 250.52 | 4.09 | 2.43 | −2.29 | −0.81 |
| 247 | −1 | 253.48 | 3.85 | 2.40 | −2.30 | −0.68 |
| 250 | −2.02 | 256.44 | 3.60 | 2.38 | −2.31 | −0.56 |
| 253 | −3.05 | 259.40 | 3.34 | 2.35 | −2.31 | −0.43 |
| 256 | −4.1 | 262.36 | 3.08 | 2.32 | −2.30 | −0.31 |
| 259 | −5.17 | 265.32 | 2.81 | 2.29 | −2.29 | −0.19 |
| 262 | −6.23 | 268.27 | 2.54 | 2.27 | −2.27 | −0.07 |
| 265 | −7.3 | 271.23 | 2.28 | 2.24 | −2.24 | −0.05 |
| 268 | −8.33 | 274.19 | 2.02 | 2.21 | −2.21 | −0.16 |
| 271 | −9.35 | 277.15 | 1.76 | 2.18 | −2.17 | −0.27 |

We claim:

1. A tracking system which comprises, in combination, a fixed support
   (a) a rotatable base mounted on said support,
   (b) means for rotating said base at a predetermined angular rate,
   (c) means responsive to a predetermined rotation of said base to rotate said base in reverse direction to a predetermined variable starting location, and
   (d) first means responsive to reverse rotation of said base to alter said predetermined rotation and said predetermined starting location, wherein said first means includes a cam, means responsive to reverse rotation of said base to alter the position of said cam, path limit determining means for said base and means responsive to said cam to set the path limits of said path limit determining means.

2. A tracking system as set forth in claim 1 further including means secured to said base rotatable in a plane normal to said base and disposed at a predetermined angle relative to said base, and second means responsive to said reverse rotation of said base to alter the angle of said means secured relative to said base.

3. A tracking system as set forth in claim 2 wherein said first means includes a cam, means responsive to reverse rotation of said base to alter the position of said cam, path limit determining means for said base and means responsive to said cam to set the path limits of said path limit determining means.

4. A tracking system as set forth in claim 2 wherein said second means includes a first rod rotatably secured to one end of said means secured, a second rod rotatably secured to the other end of said first rod, and means rotatably responsive to said reverse rotation of said base, the other end of said second rod being rigidly secured to said means rotatable and rotatable therewith.

5. A tracking system as set forth in claim 3 wherein said second means includes a first rod rotatably secured to the end of said means secured, a second rod rotatably securing the other end of said first rod, and means rotatable responsive to said reverse rotation of said base, the other end of said second rod being rigidly secured to said means rotatable and rotatable therewith.

6. A tracking system as set forth in claim 1 wherein said cam is shaped in accordance with the equation of time.

7. A tracking system as set forth in claim 3 wherein said cam is shaped in accordance with the equation of time.

8. A tracking system as set forth in claim 5 wherein said cam is shaped in accordance with the equation of time.

9. A tracking system which comprises, in combination:
   (a) energy collecting means for collecting solar energy;
   (b) means for causing said energy collecting means to travel in a longitudinal direction, (c) means to set the declination of said energy collecting means,
(d) means for controlling the operating window of said means for causing, and
(e) means responsive to a traversal of said energy collecting means in alternate opposite longitudinal directions for altering said means to set the declination and such means for controlling the operating window, wherein said means for controlling the operating window is a clock controlled switch and said means responsive to a traversal includes means to alter the start of operation of said switch wherein said means to alter the start of operation of said switch includes a cam shaped to simulate the equation of time and cam follower following the outer contour of said cam to adjust the position of said switch to alter the start of operation therein.

10. A tracking system as set forth in claim 9 further including a rod connected to said energy collecting means and a crank pivotally connected to said rod and one end thereof, the other end of said crank being rotatable about an axis spaced from said one end in response to operation of said means responsive to a traversal of said energy collecting means in opposite longitudinal directions.

* * * * *